United States Patent [19]

Yamazaki et al.

[11] 4,142,214
[45] Feb. 27, 1979

[54] APPARATUS FOR CONTROLLING FACSIMILE TRANSMITTER AND RECEIVER

[75] Inventors: Masaru Yamazaki; Susumu Okusho; Takayuki Anami, all of Hachioji, Japan

[73] Assignee: Olympus Optical Company Limited, Tokyo, Japan

[21] Appl. No.: 797,860

[22] Filed: May 17, 1977

[30] Foreign Application Priority Data

May 24, 1976 [JP] Japan .................... 51-58991

[51] Int. Cl.² .................. H04N 1/32; H04N 1/36
[52] U.S. Cl. ...................... 358/257; 358/265; 358/267; 358/304
[58] Field of Search ............ 358/257, 267, 265, 304

[56] References Cited

U.S. PATENT DOCUMENTS

| | | | |
|---|---|---|---|
| 3,313,884 | 4/1967 | Hackenberg | 358/257 |
| 3,496,287 | 2/1970 | Wheeler | 358/257 |
| 3,566,022 | 2/1971 | Bishop | 358/304 |
| 3,585,289 | 6/1971 | Huber | 358/304 |
| 3,889,057 | 6/1975 | Perreault | 358/257 |

*Primary Examiner*—Howard W. Britton
*Attorney, Agent, or Firm*—Haseltine, Lake & Waters

[57] ABSTRACT

An apparatus for controlling a facsimile transmitter and receiver in which operations at a receiving end are automatically effected in succession by a control signal delivered from a sending end. The transmitter functions to deliver a continuous "1" signal. The receiver functions to automatically start its operation when the continuous "1" signal continues for a time longer than a predetermined time. The transmitter comprises a manuscript detector. When the front end of a manuscript to be transmitted is detected a phase signal is delivered. The receiver comprises a detector and a discrimination circuit. When the phase signal is detected, a record sheet is delivered and recorded and when depletion of the phase signal is detected, a cutter is operated to cut the record sheet. The distance between the front end of the manuscript and a reading head is made equal to the distance between the front end of the record sheet and a recording head.

9 Claims, 13 Drawing Figures

APPARATUS FOR CONTROLLING FACSIMILE TRANSMITTER AND RECEIVER

FIELD OF THE INVENTION

This invention relates to an apparatus for controlling facsimile transmitter and receiver.

PRIOR ART

In a conventional apparatus for controlling a facsimile transmitter and receiver in which operations at a receiving end are automatically effected in succession by a control signal delivered from a sending end without requiring any attendant at the receiving end, in the case of transmitting the control signal for effecting the delivery of a record sheet, the cutting operation of a cutter, etc. during the delivery of a picture signal, it has been the common practice to use signals having different levels or frequencies or use a specified code composed of phase synchronization pulses. In the case of using the signals having different levels or frequencies, provision must be made of a special transmission line through which the control signal is transmitted. In the case of using a specified code composed of the phase synchronization pulses, provision must be made of mechanisms such as a modulator and demodulator. Another conventional apparatus in which a cutter for cutting the record sheet at the receiving end is located in the rear of a recording mechanism has also been proposed. But, such conventional apparatus has the disadvantage that a recorded picture has an undesirous blank space and hence is not equal in length to the manuscript, that provision must be made of a timer or cam, etc. for the purpose of bringing the delivery of the record sheet into agreement in timing with the start of the recording operation, and that in the case of changing the record sheet feeding speed, the time set for the timer or the cam must be changed.

SUMMARY OF THE INVENTION

An object of the invention, therefore, is to provide an apparatus for controlling a facsimile transmitter and receiver, which can obviate the disadvantage which has been encountered with the prior art technique, which is simple in construction and easy in handling and which can obtain a recorded picture which is equal in length to a manuscript.

A feature of the invention is the provision of an apparatus for controlling a facsimile transmitter and receiver in which operations at a receiving end are automatically effected in succession by a control signal delivered from a sending end, comprising a facsimile transmitter for delivering a continuous "1" signal, and a facsimile receiver operative to be automatically started into operation when said continuous "1" signal continues for a time longer than a predetermined time, said transmitter comprising a manuscript detector for detecting the front end of a manuscript to be transmitted and causing said continuous "1" signal to end and causing a phase signal for matching a read scanning operation at said transmitter in phase with a record scanning operation at said receiver to deliver, said receiver comprising a detector for detecting said phase signal within a given time after the end of said continuous "1" signal and causing a record sheet to deliver, and the relative position between the front end of said manuscript and a reading head at said transmitter and the relative position between the front end of said record sheet and a recording head at said receiver being determined such that when the front end of said manuscript arrives at said reading head at said transmitter, the front end of said record sheet simultaneously arrives at said recording head at said receiver.

BRIEF DESCRIPTION OF THE DRAWING

The invention will now be described in greater detail with reference to the accompanying drawings, wherein.

DETAILED DESCRIPTION

Figure 1:
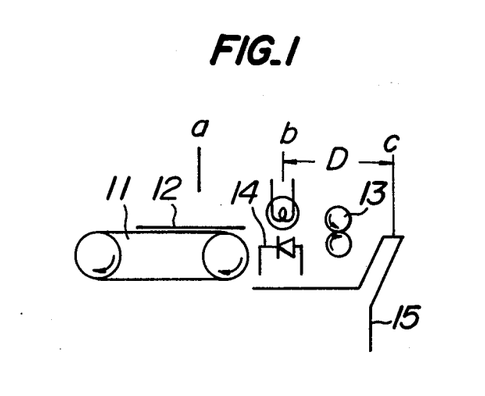
FIG. 1 is a diagrammatic view showing one embodiment of a transmitter that may be employed to practice the apparatus according to the invention.

In FIG. 1 is shown a reading mechanism of a facsimile transmitter that may be employed to practice the apparatus according to the invention. On a record sheet feeding carriage 11 is placed a manuscript 12. If transmission starts, the carriage 11 and rollers 13 are rotated to deliver the manuscript 12. The front and rear ends of the manuscript 12 are detected by a photosensor 14. The manuscript 12 is read and scanned by a scanner 15 and the result thus obtained is transmitted as a picture signal to a receiver.

Figure 2:
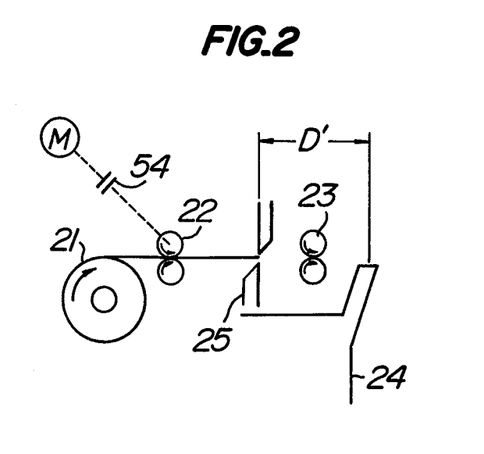
FIG. 2 is a diagrammatic view showing one embodiment of a receiver that may be employed to practice the apparatus according to the invention.

In FIG. 2 is shown a recording mechanism of a facsimile receiver that may be employed to practice the apparatus according to the invention. Provision is made of a rolled record sheet 21. The picture signal transmitted from the sending end causes rollers 22 and 23 to rotate so as to deliver the record sheet 21 to a scanner 24 which functions to effect recording and scanning. Between the rollers 22 and 23 is arranged a cutter 25 which functions to cut the record sheet 21 at its desired position by means of a signal transmitted from the sending end. The distance D between the photosensor 14 and the scanner 15 shown in FIG. 1 is made equal to the distance D' between the cutter 25 and the scanner 24 shown in FIG. 2. In addition, the feeding speed of the manuscript 13 is made equal to that of the record sheet 21.

Figure 3:
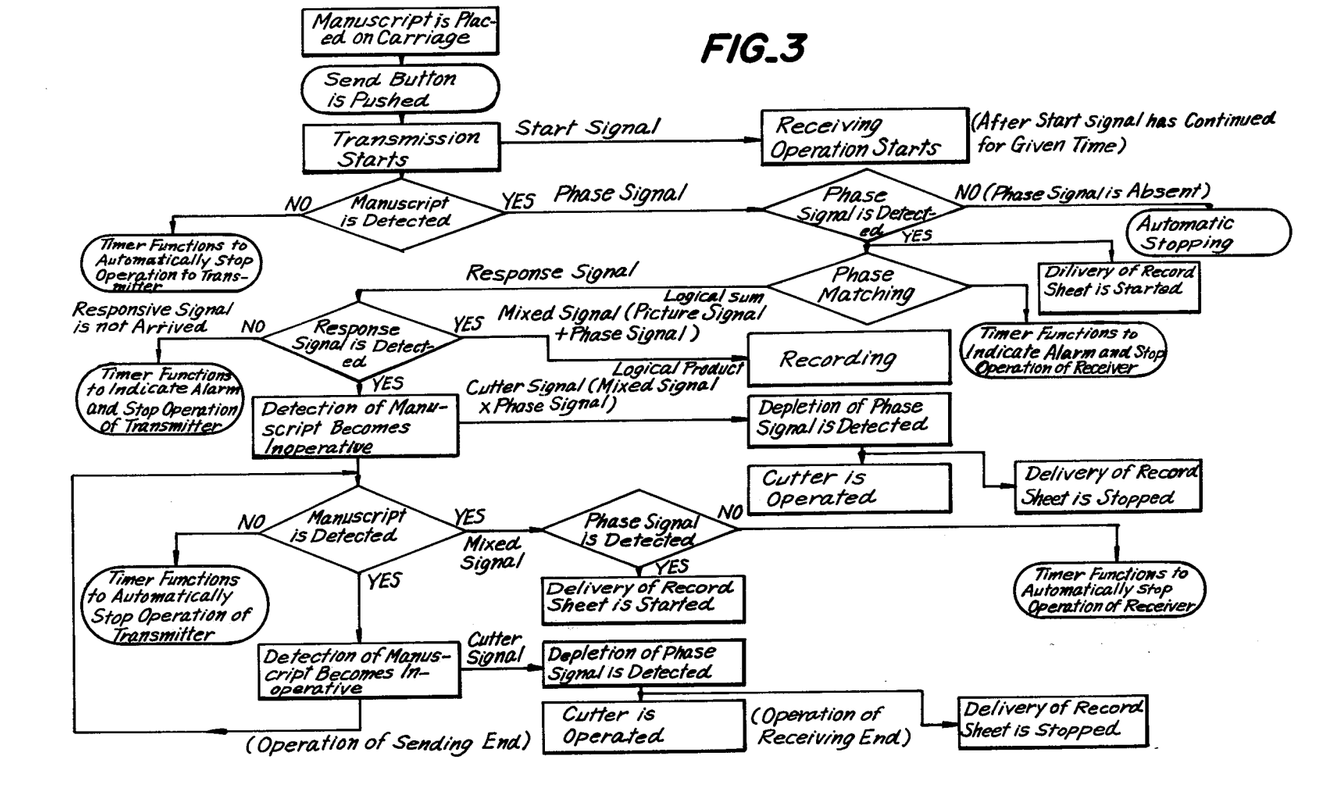
FIG. 3 is a flow chart for illustrating the operation of the apparatus for controlling facsimile transmitter and receiver according to the invention.

The sequence of operations of the transmitter and receiver embodying the invention will now be described with reference to a flow chart shown in FIG. 3. In FIG. 3, left side is shown the operation of the sending end, while in FIG. 3, right side is shown the operation of the receiving end.

In the first place, at the sending end, the manuscript 12 is placed on the carriage 11 and a send button 40 (FIG. 4) is pushed. In this case, the manuscript 12 may be placed on the carriage 11 within a given time after the send button 40 has been pushed. If the send button 40 is pushed, the transmitter starts its operation to deliver a start signal.

The receiving end functions to detect the start signal that has continued for a given time and is brought into its start condition.

At the sending end, if the front end of the manuscript 12 is detected by the photosensor 14, a phase signal is delivered. But, if the front end of the manuscript 12 could not be detected by the photosensor 14, a timer becomes operated to automatically stop the operation of the transmitter.

At the receiving end, if the phase signal could not be detected, the operation of the receiver is automatically stopped. If the phase signal is detected, the phase signal is matched in phase with a phase signal generated in the receiver. At the same time, the delivery of the record sheet 21 is started. If both the phase signals are matched in phase, a response signal is delivered to the transmitter. If both the phase signals are not matched in phase, an alarm is indicated and the operation of the receiver is stopped.

At the sending end, if the response signal is not arrived within a given time after the phase signal has been delivered to the receiver, a timer functions to indicate an alarm and stop the operations of the transmitter. If the transmitter receives the response signal, a mixed signal composed of a logical sum of the picture signal and the phase signal is delivered. The mixed signal is received at the receiving end and recorded.

At the sending end, if the rear end of the manuscript 12 is detected by the photosensor 14, a cutter signal, that is, a logical product signal composed of the mixed signal and a signal with the phase signal depleted is delivered. If such depletion of the phase signal is detected at the receiving end, the cutter 25 becomes operated to cut the record sheet 21 and at the same time only the rollers 22 are stopped to stop the delivery of the record sheet 21.

At the sending end, if the next succeeding manuscript 12 is detected by the photosensor 14, the mixed signal is delivered in the same manner as described above. At the receiving end, the phase signal in the mixed signal is detected to deliver again the record sheet 21 and record the picture signal thereon.

At the sending end, if the rear end of the manuscript 12 is detected again by the photosensor 14, the cutter signal is delivered. At the receiving end, the cutter 25 is then operated to cut the record sheet 21 and at the same time only the rollers 22 are stopped to stop the delivery of the record sheet 21 in the same manner as described above.

The above mentioned operations are repeated every time the manuscript 12 is placed on the carriage 11. At the sending end, if the front end of the next manuscript could not be detected by the photosensor 14 after the lapse of the given time from the delivery of the cutter signal, the operation of the transmitter is automatically stopped. At the receiving end, the depletion of the phase signal is detected for a given time. During this time, if the mixed signal is not detected, the receiver automatically stops its operation.

Figure 4:
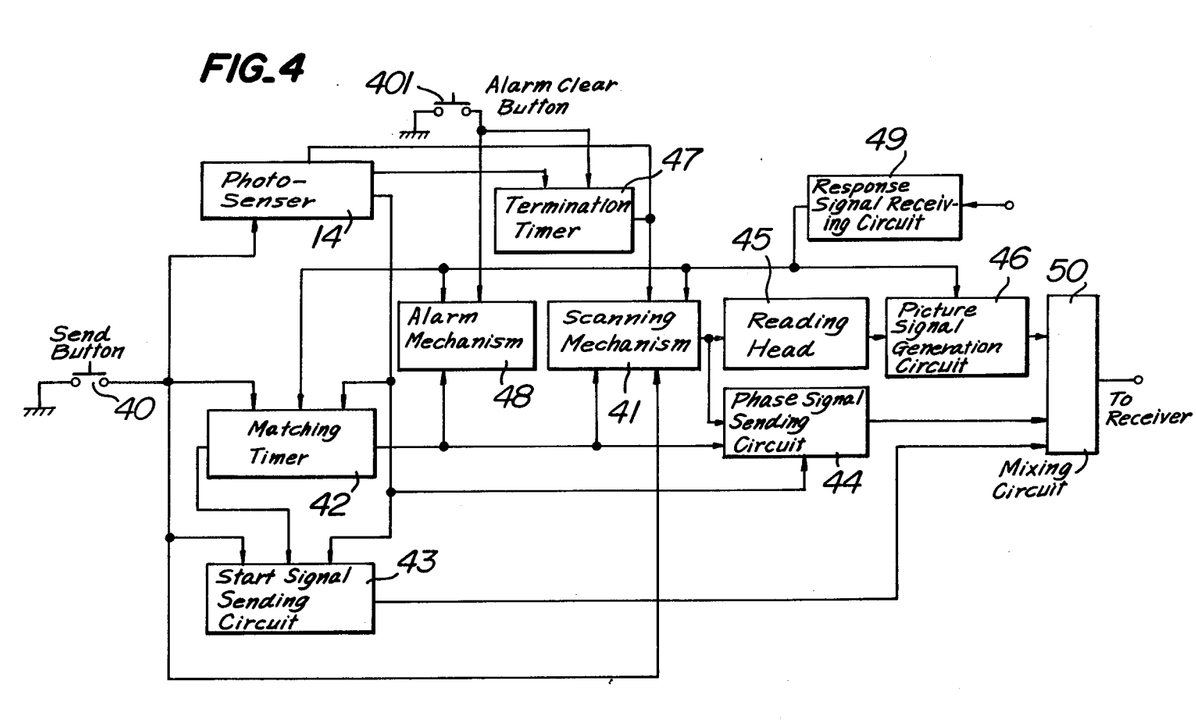
FIG. 4 is a block diagram showing the construction of one embodiment of a transmitter that may be employed to practice the apparatus according to the invention.
Figure 5:
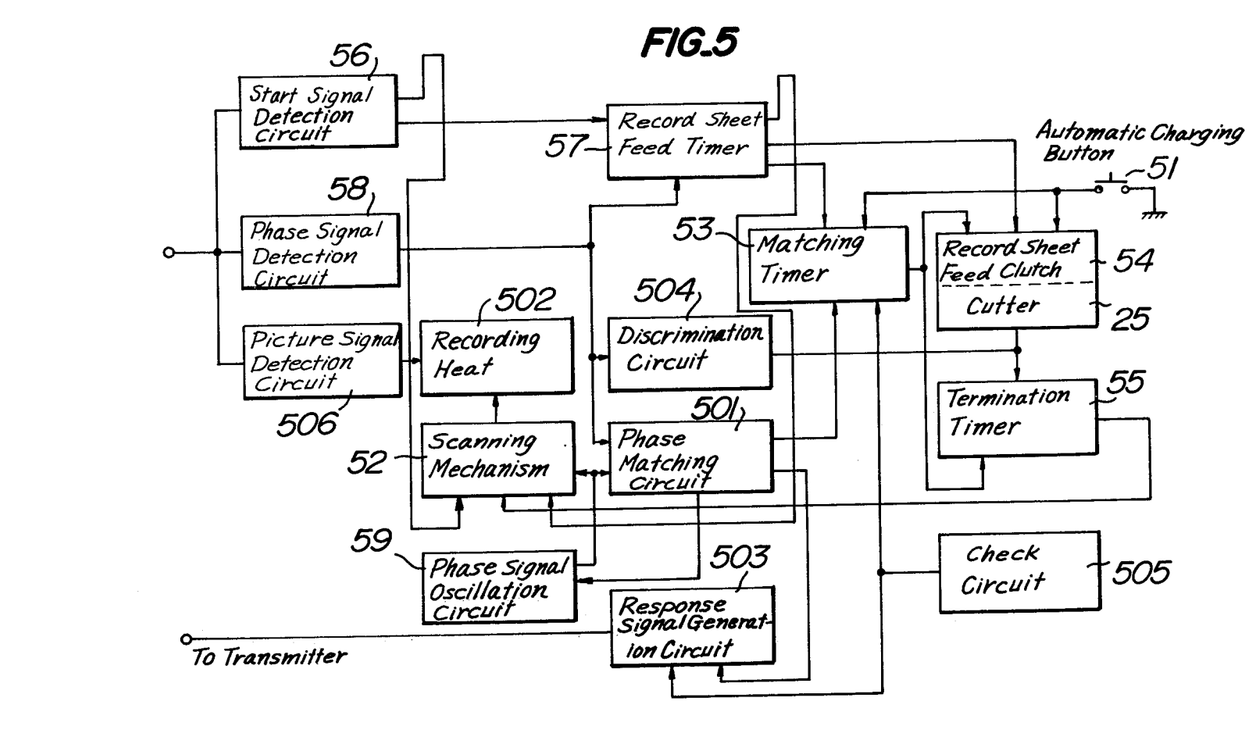
FIG. 5 is a block diagram showing the construction of one embodiment of a receiver that may be employed to practice the apparatus according to the invention.
Figure 6:
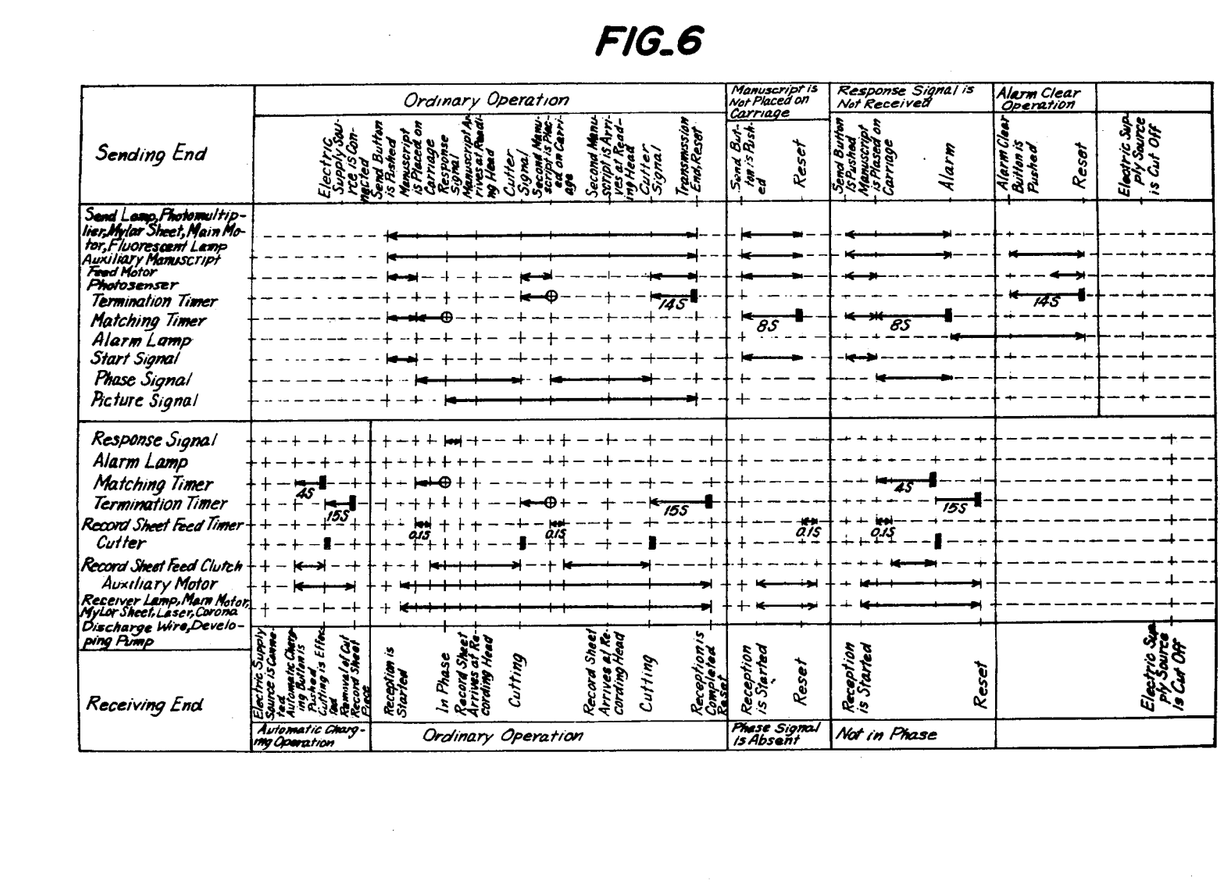
FIG. 6 is a time chart showing the operation of mechanisms and control signal of the transmitter and receiver with respect to the interval of time for the purpose of illustrating the apparatus for controlling facsimile transmitter and receiver according to the invention.

FIGS. 4 and 5 are block diagrams showing mechanisms of the transmitter and receiver those may be employed to practice the apparatus according to the invention, FIG. 6 is a time chart for the sending and receiving ends. In the time chart shown in FIG. 6, full line portions show that the mechanisms or signals listed therein are under operative conditions. For example, on line of the start signal at the sending end, the full line portion is present between the time at which the send button 40 (FIG. 4) is pushed and the time at which the manuscript 12 is placed on the carriage 11. That is, FIG. 6 shows that the start signal is delivered from the time at which the send button 40 is pushed to the time at which the manuscript 12 is placed on the carriage 11.

The ordinary operation at the sending and receiving ends will now be described with respect to the lapse of time. At first, to each of the transmitter and receiver is connected an electric supply source. At the receiver, the rolled record sheet 21 is set. If an automatic charging button 51 (FIG. 5) for the rolled record sheet 21 is pushed, an auxiliary motor in a scanning mechanism 52, a matching timer 53 and a record sheet feed clutch 54 are operated to deliver the record sheet 21. The matching timer 53 functions to supply its output to the record sheet feed clutch 54, the cutter 25 and a termination timer 55 and operate these mechanisms at the end of the interval of 4 seconds set for the matching timer 53. In FIG. 6, column showing the automatic charging operation at the receiving end, a square black mark of the matching timer 53 at the time of the cutting is effected shows the end of the interval of 4 seconds set for it and a square black mark of the cutter 25 shows the start of the operation of the cutter 25. The record sheet feed clutch 54 functions to stop the rollers 22 and hence stop the delivery of the record sheet 21. At the same time the cutter 25 functions to cut the record sheet 21. The termination timer 55 functions to continue the operation of the auxiliary motor in the scanning mechanism 52 for 15 seconds during which the rollers 23 only is rotated to discharge a record sheet piece which has been cut by the cutter 25 and remained at the side of the scanner 24. At the end of the interval of 15 seconds set for the termination timer 55, the auxiliary motor in the scanning mechanism 52 is stopped and the electric supply source only is still connected to the receiver. The above described operation causes the front end of the record sheet 21 to locate at a given position immediately before the cutter 25.

Next, at the sending end, the manuscript 12 to be transmitted is placed on the carriage 11 and the send button 40 is pushed. This cases a scanning mechanism 41 including a main motor, auxiliary motor, photomultiplier, etc., the photosensor 14, a matching timer 42 and a start signal sending circuit 43 to start their operations.

The start signal sending circuit 43 is constructed so as to deliver a start signal which is a continuous signal having a predetermined frequency or a continuous "1" signal for a base band transmission system. The continuous signal having the predetermined frequency is converted into the continuous "1" signal at the receiver. The start signal, therefore, will hereinafter be called as the continuous "1" signal. The transmitter functions to deliver this start signal to the receiver.

The time allowed for the operation of the matching timer 42 to its end is 8 seconds, so that within this time the send button 40 may be pushed and then the manuscript 12 may be placed on the carriage 11. If the manuscript 12 placed on the carriage 11 arrives at the photosensor 14, the front end of the manuscript 12 is detected by the photosensor 14. The detection signal of the photosensor 14 is supplied to the matching circuit 42, the start signal sending circuit 43 and a phase signal sending circuit 44 to reset the matching timer 42, stop the delivery of the start signal and deliver a phase signal for effecting synchronization of the scanners 15 and 24.

At the receiving end, a start signal detection circuit 56 functions to detect continuation of the start signal for a time longer than a predetermined time and then the scanning mechanism 52 is started into operation.

If the start signal is stopped after the lapse of a given time, a record sheet feed timer 57 becomes operated. If the phase signal transmitted from the transmitter is detected by a phase signal detection circuit 58 within 0.1 second allowed for the operation of the record sheet feed timer 57 to end, the record sheet feed clutch 54 becomes operated to cause the rollers 22 to rotate, thereby delivering the record sheet 21.

In addition, that phase signal which is received after the start signal has been terminated causes the matching timer 53 to operate. The matching timer 53 functions to determine such positional relation that when the front end of the manuscript 12 reaches to the reading head 45, the front end of the record sheet 21 arrives at the recording head 502.

The output delivered from a phase signal oscillation circuit 59 and for scanning the scanner 24 at the receiver end and the phase signal transmitted from the transmitter are supplied to a phase matchint circuit 501 whose output is fed back to the phase signal oscillation circuit 59. The phase matching circuit 501 functions to match the phase of the output delivered from the phase signal oscillation circuit 59 with the phase of the phase signal transmitted from the transmitter. As a result, it is possible to synchronize the scanner 15 of the transmitter with the scanner 24 of the receiver. As soon as the phase matching circuit 501 functions to bring the phase of the sending end into coincidence with the phase of the receiving end, a response signal generation circuit 503 functions to deliver a response signal having a predetermined frequency or code to the transmitter. At the same time, the phase matching circuit 501 functions to deliver an output to the matching timer 53 so as to stop its operation before the end of the interval of 4 seconds set for it. In FIG. 6, a symbol ⊕ shows that the timer is stopped before the end of the interval of time set for it.

At the sending end, if a response signal receiving circuit 49 receives the response signal, a mixed signal composed of a logical sum of the phase signal and a picture signal read out by a reading head 45 and treated by a picture signal generation circuit 46 is delivered through a mixing circuit 50 to the receiver. The above described operations are completed prior to arrival of the manuscript 12 at the scanner 15 at the sending end and prior to arrival of the record sheet 21 at the scanner 24 at the receiving end.

Figure 7:
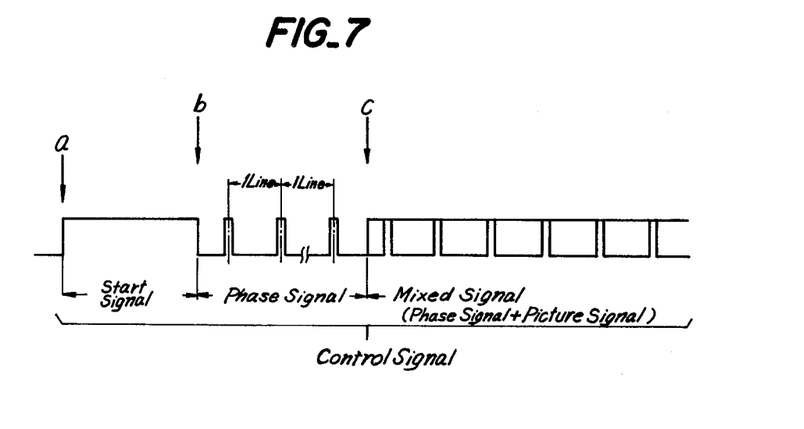
FIG. 7 is a waveform of signals transmitted from the transmitter that may be employed to practice the apparatus according to the invention.

In FIG. 7 is shown a waveform of control signals for effecting the above described operations. In FIG. 7, a designates that time at which the send button 40 is pushed, b designates that time at which the manuscript 12 is placed on the carriage 11 and c designates that time at which the picture signal is delivered. A waveform portion between the times a and b shows the start signal, pulses between the times b and c show the phase signals and a waveform portion on and from the time c shows the mixed signal.

When the manuscript 12 arrives at the reading head 45 provided for the scanner 15, the mixed signal composed of the phase signal and a picture signal obtained by scanning the manuscript 12 is transmitted to the receiver. If the rear end of the manuscript 12 is detected by the photosensor 14, a cutter signal obtained by depleting the phase signal from the mixed signal is delivered to the transmitter and at the same time a termination timer 47 starts its operation.

At the receiving end, a picture signal detection circuit 506 functions to detect the picture signal from the above mentioned mixed signal.

The picture signal is supplied to a recording head 502 provided in the scanner 24 and recorded on the record sheet 21.

Upon receipt of the cutter signal with the phase signal depleted, a discrimination circuit 504 functions to detect the depletion of the phase signal and simultaneously causes the cutter 25 to operate and hence cut the record sheet 21. At the same time, the record sheet feed clutch 54 is operated to stop the rotation of the rollers 22 thus stopping the delivery of the record sheet 21. In addition, the terminator timer 55 becomes simultaneously started to operate. The rollers 23 function to deliver and discharge the record sheet piece cut from the rolled record sheet 21 and recorded.

Figures 8A, 8B, 8C:
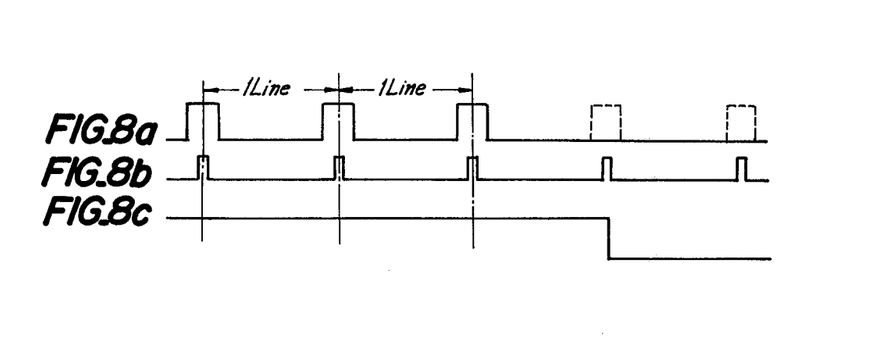
FIG. 8a is a waveform of one example of a phase signal of the transmitter that may be employed to practice the apparatus according to the invention.
FIG. 8b is a waveform of one example of a phase signal of the receiver that may be employed to practice the apparatus according to the invention.
FIG. 8c is a waveform of one example of a cutter signal of the receiver.

In FIG. 8a is shown the phase signal at the sending end. In FIG. 8b is shown the phase signal at the receiving end. In FIG. 8c is shown the cutter signal at the receiving end. In FIG. 8a, that portion of the phase signal which is shown by dotted lines shows the depletion of the phase signal, that is, shows the cutter signal. As shown in FIGS. 8a and 8b, the phase signal at the sending end is in phase with the phase signal at the receiving end, so that these phase signals are usually located at the same position on the time axis. At this time, the discrimination circuit 504 at the receiving end functions to detect te depletion of the phase signal at the sending end. The cutter 25 is located at that position which corresponds to the position of the photosensor 14 at the sending end, so that it is possible to cut the record sheet 21 into a length which is equal to the length of the manuscript 12.

Following to the first manuscript to be transmitted, if a second manuscript is placed on the carriage 11 and the front end thereof is detected by the photosensor 14, the transmitter functions to deliver again the mixed signal composed of the phase signal and the picture signal and stop the operation of the transmitter before the end of the interval of 14 seconds set for the termination timer 47.

At the receiving end, if the phase signal in the mixed signal is detected by the discrimination circuit 504, the termination timer 55 is stopped and at the same time the record sheet feed timer 57 becomes operative.

At the end of the interval of time for which the termination timer 57 is set, the record sheet feed clutch 54 becomes operated to rotate the rollers 22 so as to deliver the record sheet 21. When the record sheet 21 arrives at the recording head 502, the recording operation is started. The following operations from the detection of the rear end of the manuscript 12 to the cutting of the record sheet 21 are effected in the same manner as in the case of the first manuscript. The operations on and after the third manuscript are effected in the same manner as in the case of the second manuscript.

In the case of the termination of transmission, if the rear end of the final manuscript is detected by the photosensor 14, the operation of the termination timer 47 is started to operate as described above. If the front end of the next manuscript is not detected by the photosensor 14 before the end of the interval of 14 seconds for which the termination timer 47 is set, the termination timer 47 at the end of the interval of 14 seconds functions to automatically stop the operation of the transmitter and reset it.

At the receiving end, the termination timer 55 is operated at the same time as the cutting of the record sheet 21. From this time to the end of the interval of 15 seconds for which the termination timer 55 is set, if the receiving end receives the phase signal depleted signal and if the phase signal could not be detected, the operation of the receiver is automatically stopped at the end of the interval of 15 seconds set for the termination timer 55.

At the sending end, even though the send button 40 is pushed, if the manuscript 12 is not placed on the carriage 11, the photosensor 14 does not deliver its output signal to the matching timer 42, so that matching timer 42 which is operated when the push button 40 is pushed reaches to the end of the interval of 8 seconds set for it and hence the transmitter automatically stops it operation and is reset.

At the receiving end, the start signal transmitted from the transmitter is detected and hence the receiver starts its operation. But, it is impossible to detect the phase signal transmitted from the transmitter even after the end of the interval of 0.1 second set for the record sheet feed timer 57. As a result, at the end of the interval of 0.1 second set for the record sheet feed timer 57, the receiver automatically stops its operation and is reset.

At the receiving end, if the phase signal transmitted from the transmitter is not in phase with the phase signal generated in the receiver due to some reasons or if a check circuit 505 detects certain abnormal conditions such as absence of the record sheet, breakage of a corona discharge wire, etc., the response signal is not delivered. The phase signal from the transmitter is detected by the record sheet feed timer 57 which starts to operate the matching timer 53. At the end of the interval of 4 seconds set for the matching timer 53, the record sheet 21 is cut and at the same time the record sheet feed clutch 54 functions to stop the delivery of the record sheet 21. In addition, as the cutter 25 is operated, the termination timer 55 also starts its operation. The cut record sheet piece is discharged and at the end of the interval of 15 seconds set for the termination timer 55, the receiver is automatically stopped and reset.

At the sending end, the response signal is not arrived, so that the matching timer 42, whose operation is started when the phase signal is delivered from the phase signal sending circuit 44 to the receiver, arrives at the end of the interval of 8 seconds for which it is set. This causes an alarm mechanism 48 to operate and indicate the alarm, thus automatically stopping the operation of the transmitter.

At the sending end, if an alarm clear button 401 is pushed, the alarm mechanism 48 becomes inoperative and the termination timer 47 becomes operated to start the operation of the manuscript feed motor in the scanning mechanism 41 so as to discharge the manuscript 12. At the end of the interval of 14 seconds for which the termination timer 47 is set the transmitter automatically stops its operation and is brought into its reset condition.

At the receiving end, after the delivery of the response signal from the response signal generation circuit 503 to the transmitter, if the check circuit 505 finds out the abnormal condition such as the absence of the record sheet, breakage of the corona discharge wire, out of synchronization, depletion of the developing liquid, etc., the alarm is indicated and the response signal is delivered from the response signal generation circuit 503. At the same time, the record sheet is cut and the delivery of the record sheet is stopped. The termination timer 55 is also operated and after the indication of the alarm at the end of the interval of 15 seconds for which the termination timer 55 is set, the receiver is automatically stopped. During this period, the cut record sheet piece is discharged from the receiver.

The transmitter receives the response signal from the receiver and causes the alarm mechanism 48 to operate, thereby indicating the alarm and stopping the operation of the transmitter.

Figures 9A, 9B, 9C:
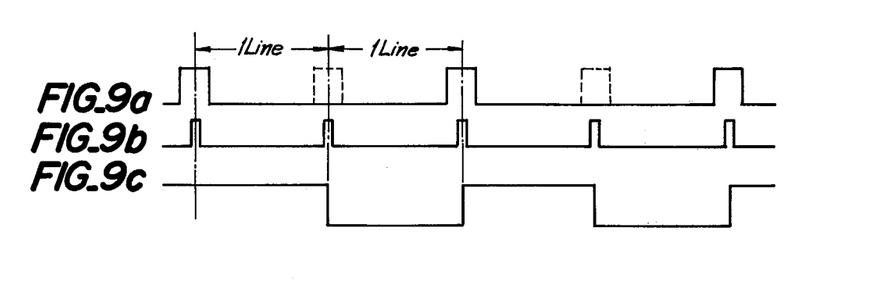
FIG. 9a is a waveform of another example of the phase signal of the transmitter.
FIG. 9b is a waveform of another example of the phase signal of the receiver.
FIG. 9c is a waveform of another example of the cutter signal of the receiver.

In the above described embodiment, the information was transmitted in response to the presence and absence of the phase signal only. Alternatively, various kinds of informations may be transmitted by a combination of the presence and absence of the phase signal. For example, in the above described embodiment, the delivery of the phase signal was stopped during the interval of time from the detection of the rear end of a first manuscript to the detection of the front end of a second manuscript. Alternatively, the phase signals may alternatively be fed from the transmitter as shown in FIG. 9a to obtain an output at the receiver as shown in FIG. 9c. If this output is used to control the cutter 25 and record sheet feed clutch 54, it is possible to prevent erroneous operation due to noises, etc. produced in the transmission line. In FIG. 9b is shown a phase signal at the receiving end. In addition, the phase signal may be divided into various portion and one of these portions may be used as a pilot signal and the remaining portions may be used to effect the above described control operations.

The constructions of the transmitter and receiver are not limited to those shown in FIGS. 4 and 5 and various modifications and alternations thereof are possible.

Heretofore, it has been the common practice to cause the transmitter to start its auxiliary scanning operation after the transmitter has received the response signal from the receiver, that is, after the receiver becomes ready for operation. As a result, the first manuscript must wait until the receiver becomes ready for operation and hence takes an extra time.

On the contrary, in the control apparatus according to the invention, it is possible to start the auxiliary scanning operation at both the sending and receiving ends without awaiting the response signal. Only when the response signal generation circuit 503 at the receiving end could not generate the response signal, both the transmitter and the receiver stop their operations. Thus, the invention can shorten operating time.

In addition, in the present invention, the front end of the manuscript 12 relative to the reading head 45 at the sending end and the front end of the record sheet 21 relative to the recording head 502 at the receiving end are determined such that the distance D between the photosensor 14 and the scanner 15 shown in FIG. 1 is equal to the distance D' between the cutter 25 and the scanner 24 shown in FIG. 2, i.e. D=D'.

As a result, it is possible to obtain a record picture which is equal in length to the manuscript 12 to be transmitted.

What is claimed is:

1. An apparatus for controlling a facsimile transmitter and receiver in which operations at a receiving end are automatically effected in succession by a control signal delivered from a sending end, comprising a facsimile transmitter for delivering a continuous "1" signal, and a facsimile receiver operative to be automatically started into operation when said continuous "1" signal continues for a time longer than a predetermined time, said transmitter comprising a manuscript detector for detecting the front end of a manuscript to be transmitted and causing said continuous "1" signal to end and producing a phase signal for matching a read scanning operation at said transmitter in phase with a record scanning operation at said receiver, said phase signal being produced when the front end of the manuscript is detected by said manuscript detector, said receiver comprising a detector for detecting said phase signal within a given time after the end of said continuous "1" signal and causing a record sheet to advance, the relative positions between the front end of said manuscript and a reading head at said transmitter and the relative position between the front end of said record sheet and a recording head at said receiver being determined such that when the front end of said manuscript arrives at said reading head at said transmitter, the front end of said record sheet simultaneously arrives at said recording head at said receiver.

2. The apparatus according to claim 1 wherein said transmitter comprises further means for automatically stopping its operation when said manuscript is not detected by said manuscript detector after the lapse of the interval of a predetermined time from the starting time of said transmitter and said receiver comprises further means for stopping its operation when said phase signal is not received at said receiver within a predetermined time after the end of said continuous "1" signal.

3. The apparatus according to claim 1 wherein said receiver comprises further means for matching said phase signal delivered from said transmitter in phase with a phase signal generated at said receiver and for delivering a response signal having a predetermined frequency or code to said transmitter when the scanning operation of a reading head at said transmitter is synchronized with the scanning operation of a recording head at said receiver.

4. The apparatus according to claim 3 wherein said receiver comprises further means including a timer for starting its operation when said phase signal is detected and a check circuit, said further means being operative to stop the delivery of said response signal and automatically stop the operation of said receiver at the end of the interval of a given time set for said timer when both said phase signals are not matched in phase or said check circuit detects certain abnormal condition and said transmitter comprises further means including a timer for starting its operation when said phase signal is delivered, said means being operative to automatically stop the operation of said transmitter at the end of the interval when said response signal is not detected at said transmitter.

5. The apparatus according to claim 4 wherein said receiver comprises further means for delivering again said response signal to said transmitter when said check circuit detects the abnormal condition that said record sheet is absent, that the scanning operation of said reading head at said transmitter is out of synchronism with the scanning operation of said recording head at said receiver, that the developing liquid is absent, and automatically stopping the operation of said receiver, said transmitter comprises further means for automatically stopping its operation upon receipt of said response signal.

6. The apparatus according to claim 2 wherein said transmitter comprises further means for delivering a mixed signal composed of a logical sum of said phase signal and a picture signal from said transmitter when said response signal is received and said receiver comprises further means for effecting recording of said record sheet when said mixed signal is received.

7. The apparatus according to claim 6 wherein said transmitter comprises further means for delivering a signal with said phase signal depleted from said mixed signal and said receiver comprises further means for detecting the depletion of said phase signal, said means being operative to cause a cutter to operate and cut said record sheet and cause record sheet feed rollers to stop so as to stop said record sheet located in front and said cutter.

8. The apparatus according to claim 7 wherein said transmitter comprises further means for delivering again said mixed signal when a second manuscript is detected by said manuscript detector, said receiver comprises further means which upon receipt of said mixed signal becomes operated to drive the record feed rollers so as to deliver the record sheet, said transmitter comprises further means for delivering again a signal with the phase signal depleted from said mixed signal when the rear end of said second manuscript passes over said manuscript detector, said receiver comprises further means for detecting the depletion of said phase signal so as to operate a cutter and stop the record sheet feed rollers, said transmitter and receiver being operative to repeat said operations when a number of manuscripts are detected in succession by said manuscript detector.

9. The apparatus according to claim 8 wherein said transmitter comprises further means for stopping its operation when the manuscript is not detected by said manuscript detector for a predetermined time after the manuscript has not been detected by said manuscript detector, said receiver comprises further means for automatically stopping its operation when the removal of said phase signal is detected for a predetermined time.

* * * * *